(12) United States Patent
Barlier et al.

(10) Patent No.: US 6,921,068 B2
(45) Date of Patent: Jul. 26, 2005

(54) VISE STRUCTURE FOR POSITIONING AND MAINTAINING PARTS TO BE MACHINED

(75) Inventors: Claude Barlier, Coinches (FR); Alain Wadsworth, Ban de Laveline (FR)

(73) Assignee: Centre d'Ingéniérie de Recherche et de Transfert de l'Esstin à Saint Die (C.I.R.T.E.S.), Saint Die (FR)

( * ) Notice: Subject to any disclaimer, the term of this patent is extended or adjusted under 35 U.S.C. 154(b) by 0 days.

(21) Appl. No.: 10/276,218

(22) PCT Filed: May 14, 2001

(86) PCT No.: PCT/FR01/01444

§ 371 (c)(1),
(2), (4) Date: May 19, 2003

(87) PCT Pub. No.: WO01/87538

PCT Pub. Date: Nov. 22, 2001

(65) Prior Publication Data

US 2003/0173726 A1 Sep. 18, 2003

(30) Foreign Application Priority Data

May 15, 2000 (FR) .............................. 00 06184

(51) Int. Cl.$^7$ ................................. B25B 1/00
(52) U.S. Cl. ......................................... 269/7
(58) Field of Search ................ 269/7, 22, 55, 269/58; 29/559; 51/277

(56) References Cited

U.S. PATENT DOCUMENTS

| | | | |
|---|---|---|---|
| 2,428,658 A | 10/1947 | Falk et al. | |
| 2,477,060 A | 7/1949 | Hudak | |
| 2,479,191 A | 8/1949 | Williams et al. | |
| 3,039,146 A | 6/1962 | Engel | |
| 3,612,387 A | * 10/1971 | Rathbun | .................. 228/44 |
| 3,790,152 A | * 2/1974 | Parsons | ..................... 269/7 |
| 3,932,923 A | 1/1976 | DiMatteo | |
| 4,001,069 A | 1/1977 | DiMatteo | |
| 4,338,068 A | 7/1982 | Suh et al. | |
| 4,586,690 A | 5/1986 | Härtel et al. | |
| 4,601,652 A | 7/1986 | Ando et al. | |
| 4,675,825 A | 6/1987 | DeMenthon | |
| 4,752,352 A | 6/1988 | Feygin | |
| 4,781,555 A | 11/1988 | Cook | |
| 5,015,312 A | 5/1991 | Kinzie | |
| 5,031,483 A | 7/1991 | Weaver | |

(Continued)

FOREIGN PATENT DOCUMENTS

| | | |
|---|---|---|
| DE | 3711470 | 10/1988 |
| DE | 4041105 | 6/1992 |

(Continued)

OTHER PUBLICATIONS

Bocking et al., "Electrochemical Routes for Engineering Tool Production", The GEC Journal of Technology, vol. 14, No. 2, pp. 66 to 74 (1997).

(Continued)

*Primary Examiner*—Robert C. Watson
(74) *Attorney, Agent, or Firm*—Gary M. Cohen

(57) ABSTRACT

A vise structure for maintaining in position parts which are to be machined, including but not limited to parts which are to undergo micro-milling operations in a fast prototyping process, includes a fixing bed having a cavity for receiving a thermofusible material which is capable of being reversibly brought from a liquid state to a solid state. A free surface of the fixing bed is continuously urged into contact with the surface of a part which is to be machined, and the fixing bed includes apparatus for heating and cooling the thermofusible material to enable a part arranged on the fixing bed to be selectively released and retained in position on the fixing bed.

10 Claims, 1 Drawing Sheet

U.S. PATENT DOCUMENTS

| | | | |
|---|---|---|---|
| 5,354,414 A | 10/1994 | Feygin |
| 5,514,232 A | 5/1996 | Burns |
| 5,663,883 A | 9/1997 | Thomas et al. |
| 5,725,891 A | 3/1998 | Reid, Jr. |
| 5,765,137 A | 6/1998 | Lee |
| 5,793,015 A | 8/1998 | Walczyk |
| 5,847,958 A | 12/1998 | Shaikh et al. |
| 6,136,132 A | 10/2000 | Kinzie |
| 6,276,656 B1 | 8/2001 | Baresich |
| 6,284,182 B1 | 9/2001 | McNally |
| 6,324,438 B1 | 11/2001 | Cormier et al. |
| 6,358,029 B1 | 3/2002 | Niimi |
| 6,405,095 B1 | 6/2002 | Jang et al. |
| 6,409,902 B1 | 6/2002 | Yang et al. |
| 6,544,024 B1 | 4/2003 | Yim |
| 6,617,601 B1 | 9/2003 | Wiklund |
| 2003/0006001 A1 | 1/2003 | Yang et al. |

FOREIGN PATENT DOCUMENTS

| | | |
|---|---|---|
| EP | 0585502 | 3/1994 |
| EP | 0606627 | 7/1994 |
| EP | 0655317 | 5/1995 |
| EP | 0655668 | 5/1995 |
| EP | 0738583 | 10/1996 |
| EP | 0811457 | 12/1997 |
| FR | 2233137 | 1/1975 |
| FR | 2673302 | 8/1992 |
| FR | 2750064 | 12/1997 |
| GB | 2011814 | 7/1979 |
| WO | WO/9112120 | 8/1991 |
| WO | WO/9508416 | 3/1995 |

OTHER PUBLICATIONS

Patent Abstracts of Japan, vol. 016, No. 370 (M–1292) Published: Aug. 10, 1992 (pertaining to JP 04 118221 (Fujitsu Ltd.), published Apr. 20, 1992).

Patent Abstracts of Japan, vol. 1995, No. 11 Published: Dec. 26, 1995 (pertaining to JP 07 214274 (U Mold:KK), published Aug. 15, 1995).

2003/0141609 A1 (Jia)–Published: Jul. 31, 2003.

2002/0162940 A1 (Frul et al.)–Published: Nov. 7, 2002.

* cited by examiner

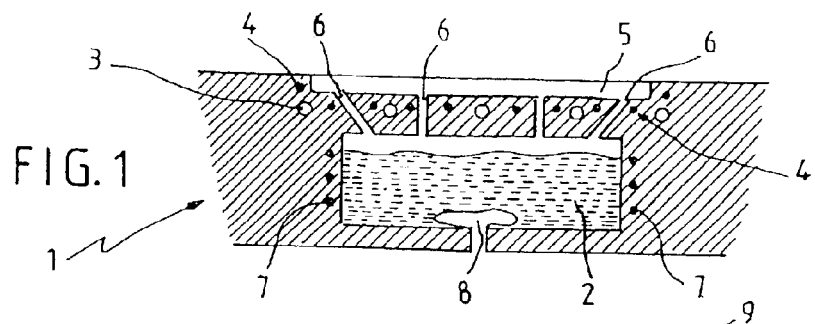
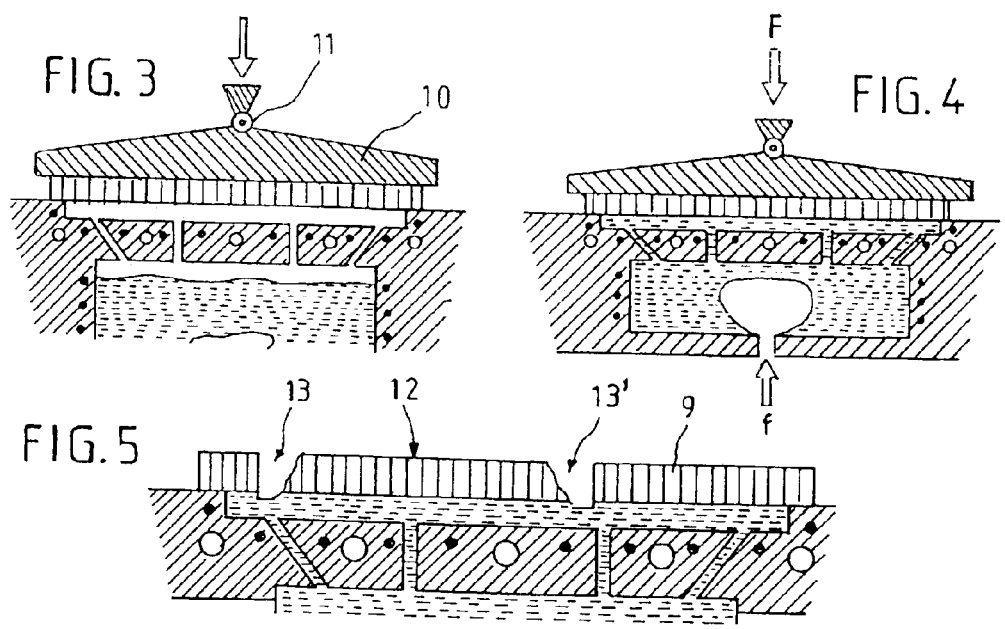

VISE STRUCTURE FOR POSITIONING AND MAINTAINING PARTS TO BE MACHINED

BACKGROUND OF THE INVENTION

The present invention generally relates to a novel vise structure for positioning and holding parts that need to be held in position, for example, for a machining operation, including but not limited to a micromilling operation associated with a rapid prototyping process.

It is to be understood that the vice structure of the present invention is not restricted to such applications. To the contrary, the vice structure of the present invention can be implemented in association with any mechanical, laser, water jet, or other machining process involving the temporary holding in position of a workpiece in a nondestructive manner. The vice structure of the present invention can further be implemented for reversibly holding a workpiece in position, for use in a manufacturing or an assembly process.

In general, the present application will make reference to a rapid proto typing process which is known by the name "STRATOCONCEPTION" (a registered trademark), and which is disclosed, for example, in the commonly owned European Patent No. 0 585 502-B1. Reference will also be made to the commonly owned French Patent Applications No. 98 14687 and No. 98 14688.

In general, the "STRATOCONCEPTION" process can be used to produce mechanical parts and items, particularly prototypes, from a specific computer-aided design. This is achieved by the successive steps of performing a virtual breakdown of the part to be produced into elementary laminates, placed in an array, manufacturing a plurality of elementary laminates or layers, building up the plurality of manufactured layers, and assembling the layers to form the part to be produced. The laminates originate from a prior break-down of the part on predetermined planes, and in one or more determined steps.

The underlying principle is that the volume of the part to be reproduced, as a prototype, is broken down into a multitude of laminates. The laminates are produced by machining, for example, by the rapid micromilling of a material in plate or sheet form. The materialto be used can, for example, be made of wood, a composite, plastic or metal.

The laminate that is to be machined can be held in place in several ways. Mechanical systems operating on a vacuum, or alternatively, the freezing of a thin film of water or the use of sticky tape, have been proposed and used.

While, in most cases, these systems are satisfactory, they are not truly universal, particularly for small and/or perforated parts. For mechanical holding systems, it is also necessary to perform handling operations which are prejudicial to the economy of the process. Furthermore, such processing currently entails the use of expensive consumable materials. In addition, during some machining operations, problems associated with overthicknesses of the holding material are encountered. Finally, the problem of cleaning the parts has not been satisfactorily solved.

There is, therefore, a need for a vise structure which does not exhibit the drawbacks of the prior devices.

SUMMARY OF THE INVENTION

In accordance with the present invention, this is achieved with a novel vise structure for holding parts that are to undergo a machining operation, including but not limited to a micromilling operation associated with a rapid prototyping process. The vice structure includes a fixing bed having suitably distributed reservations in which a thermofusible material can be brought reversibly from a liquid state into a solid state. A free surface of the thermofusible material comes into registration with the surface of the bed, and the bed includes systems for heating and cooling the thermofusible material to allow the part arranged on the bed to be controllably released and immobilized.

The invention will be better understood with reference to the description which follows, together with the following drawings.

BRIEF DESCRIPTION OF THE DRAWINGS

FIG. 1 is a schematic, cross-sectional view of the fixing bed of the present invention, in a rest position.

FIG. 2 is a schematic, cross-sectional view of the fixing bed of the present invention during the positioning of a plate that is to be machined.

FIG. 3 is a schematic, cross-sectional view of the fixing bed of the present,invention during immobilization of the plate that is to be machined.

FIG. 4 is a schematic, cross-sectional view of the fixing bed of the present invention showing the plate being held in position by actuation of the vise.

FIG. 5 is a schematic, cross-sectional view of the fixing bed of the present invention showing machining of the laminate that is immobilized on the vise.

FIG. 6 illustrates an alternative embodiment of the device shown in FIG. 5, illustrating further operation on a machined plate which has penetrating regions.

DETAILED DESCRIPTION OF THE INVENTION

Referring to FIG. 1, the device (1) of the present invention generally comprises a tank (2) for receiving a quantity of fusible material, a cooling circuit (3), an array of resistive heating elements (4), and an open upper cavity (5). The cavity (5) is capable of receiving fusible material from the tank (2), and is connected to the tank (2) by a network of ducts (6). The tank (2), which forms a reservoir for the fusible material, includes resistive heating elements (7) in its side walls.

The fusible material is displaced by an elastic air reservoir (8). It will be understood that when the fusible material is in the liquid state, pressurization of the air reservoir (8) will increase its volume, which will drive the fusible material through the ducts (6) and toward the cavity (5).

Referring now to FIG. 2, a plate (9) has been placed on the device (1), which acts as a bed for receiving the plate (9). The profile of the plate (9) is slightly greater than the working area of the cavity (5). By manufacturing the top face of the bed (1), to be perfectly flat, the top face acts as a placement reference for setting down the plate (9), or some other workpiece that is to be machined.

Referring now to FIG. 3, a retractable upper platen (10) is mounted on a ball joint (11). The platen (10) acts to keeps the plate (9) in contact with the placement reference (i.e., the top face of the bed) during portions of the process when the plate (9) is to be stuck down in position.

FIG. 4 illustrates operation of the bed (1) as a vise for holding down the plate (9). A force represented by an arrow F is applied to the platen (10). Air pressure, represented by an arrow f, is applied to the air reservoir (8). It will be understood that the force F must be greater than the opposing force f.

The fusible material is brought into a "liquid" phase by the resistive heating elements (4). By inflating the elastic reservoir (8), the fusible material fills the pocket under the platen (10). Vents can be provided in the bed (1) to serve as an indicator that the cavity (5) has been filled. While maintaining the pressure in the elastic reservoir (8), the fusible material is cooled, the pressure in the elastic reservoir (8) is shut off and the platen (10) is retracted to allow machining to be performed. The exposed plate (9) is then held in position by the cooled fusible material.

FIG. 5 illustrates machining of the plate (9) which, after machining, forms a laminate (12) for forming the part which is to be produced. Machining is performed by implementing, for example, the above-mentioned "STRATOCONCEPTION" process. During machining, the laminate (12) is held uniformly. The milling cutter used for the machining is capable of machining into the thermofusible material, without damage, in order to alleviate either the effect of poor heightwise adjustment or the problem of burrs left by the radius at the tip of the machining tool. This is illustrated by volumes (13, 13') which have been hollowed away by such milling and converted into chips.

To release the laminate (12), the thermofusible material is brought into its "liquid" phase. Excess material on the laminate is eliminated by applying a solvent.

FIG. 6 shows an alternative embodiment of the device (1) in which the upper platen (10) is equipped with a cooling circuit (14). In operation, the upper platen (10) is once again applied to the machined plate (12). The thermofusible material is heated and, responsive,to an increase in the volume of the elastic reservoir (8), the volumes left by the chips which had previously been removed by the machining are filled with the thermofusible material. By adjusting the temperature gradient, the plate (12) can be built up. The top platen (10) rapidly cools the volume of material occupying the space left by the removed chips. The plate is at this stage comprised of two materials.

Following this,.there are two alternatives. One alternative is for the upper platen to be covered with a non-stick film (for example, PTFE) so the plate can simply be removed and turned over, by hand. Another alternative is for the plate to be connected by the thermofusible material to the top platen (10), which can then retract and become a new machining bed.

Numerous variations can be made without departing from the scope of the present invention. For example, the foregoing operations can be achieved using a plastic of any type, provided that it is thermofusible, allowing the material to change from a liquid state to a solid state and vice versa, several times, as a function of temperature. The bed or the platen can be made of a metal or a plastic. Secondary bearing surfaces can be arranged in the cavity (5), which can then act as reference blocks for ensuring better distribution and better flatness of the bearing surface. The blocks can also be made part of the placement reference which is developed by the upper face of the bed (1). The cooling passages can also be used as heating passages, if need be.

The thermofusible material will be chosen so that it avoids any chemical intervention with the plate that is to be secured. The thermofusible material and its waste can, if necessary, easily be removed from the surface of the laminate (12) by any suitable process, examples including but not limited to a diluent, a solvent, or a mechanical process.

As a simplified alternative embodiment, the plastic can be supplied directly, from above, without using a device such as the air reservoir (8) for injecting plastic from the reservoir tank (2). In this case, a slight excess amount of fusible material is needed This excess amount of fusible material will be removed through lateral vents, during the positioning of the part (9), which can be done by hand. The system for cooling and heating the cavity (5) remains the same.

What is claimed is:

1. A vise structure for holding parts that are to undergo a machining operation, including a micromilling operation associated with a rapid prototyping process, the vice structure comprising:

a fixing bed having an exposed surface, and a cavity open to the exposed surface, for receiving a thermofusible material, wherein the thermofusible material is capable of reversibly being brought from a liquid state to a solid state, and wherein the thermofusible material defines a free surface in registration with the exposed surface of the fixing bed;

a tank operatively associated with the fixing bed, for containing a quantity of the thermofusible material;

a network of ducts connecting the tank and the cavity of the fixing bed, for delivering the thermofusible material from the tank to the cavity; and a cooling circuit and a plurality of resistive heating elements associated with the fixing bed, for selectively heating and cooling the thermofusible material;

wherein cooling of the thermofusible material in the cavity fixes a part positioned on the exposed surface of the fixing bed, immobilizing the part, and heating of the thermofusible material in the cavity releases the part positioned on the exposed surface of the fixing bed.

2. The vise structure of claim 1 wherein the resistive heating elements are associated with side walls of the tank.

3. The vise structure of claim 1 which further includes an elastic air reservoir for displacing thermofusible material in the tank, for delivery to the cavity.

4. The vise structure of claim 1 wherein the cavity has a working area, and wherein the part has a profile which is larger than the working area of the cavity.

5. The vise structure of claim 4 which further includes a retractable platen mounted on a ball joint and in registration with the cavity, for maintaining the part in contact with the exposed surface of the fixing bed during operation of the vise structure.

6. The vise structure of claim 5 wherein the platen further includes an additional cooling circuit.

7. The vise structure of claim 1 wherein the exposed surface has edges for sealingly engaging portions of the part received on the fixing bed.

8. The vise structure of claim 7, in combination with a part positioned on the exposed surface of the fixing bed, wherein the cavity has a working area, and wherein the part has a profile which is larger than the working area of the cavity.

9. The vise structure of claim 8 wherein the part is a flat plate.

10. The vice structure of claim 1 wherein the cavity is formed in the exposed surface of the fixing bed.

* * * * *